(12) United States Patent
Pocai

(10) Patent No.: US 12,060,169 B2
(45) Date of Patent: Aug. 13, 2024

(54) METHOD AND SYSTEM FOR PASSENGER INFORMATION, ORGANIZATION, LEADING, BOARDING AND SETTLING IN AIRCRAFTS, EQUIPMENT AND COMPUTER PROGRAMS THEREFOR

(71) Applicant: Ricardo Pocai, Clevelandia-Parana (BR)

(72) Inventor: Ricardo Pocai, Clevelandia-Parana (BR)

(*) Notice: Subject to any disclaimer, the term of this patent is extended or adjusted under 35 U.S.C. 154(b) by 609 days.

(21) Appl. No.: 17/282,367

(22) PCT Filed: Jan. 29, 2019

(86) PCT No.: PCT/BR2019/050026
§ 371 (c)(1),
(2) Date: Apr. 1, 2021

(87) PCT Pub. No.: WO2020/154778
PCT Pub. Date: Aug. 6, 2020

(65) Prior Publication Data
US 2021/0342753 A1 Nov. 4, 2021

(51) Int. Cl.
| | | |
|---|---|---|
| *B64F 1/30* | (2006.01) | |
| *B64D 45/00* | (2006.01) | |
| *G06Q 10/02* | (2012.01) | |
| *G06Q 50/40* | (2024.01) | |
| *G09F 19/18* | (2006.01) | |
| *G09F 19/22* | (2006.01) | |

(52) U.S. Cl.
CPC ............ *B64F 1/30* (2013.01); *B64D 45/00* (2013.01); *G06Q 10/02* (2013.01); *G06Q 50/40* (2024.01); *G09F 19/18* (2013.01); *G09F 19/228* (2013.01); *B64D 2045/007* (2013.01)

(58) Field of Classification Search
CPC .. G06Q 10/02; G06Q 10/06311; G07C 11/00; G07C 2011/02; G07C 2011/04; B64D 11/06; B64D 2045/007
See application file for complete search history.

(56) References Cited

U.S. PATENT DOCUMENTS

| | | | | |
|---|---|---|---|---|
| 6,722,612 B2* | 4/2004 | Konya | ................... | B64F 1/305 14/72.5 |
| 7,205,903 B2* | 4/2007 | Blum | ................. | G06Q 30/0241 340/555 |
| 8,534,216 B2* | 9/2013 | Wallace | ................. | G09B 19/00 116/200 |

(Continued)

OTHER PUBLICATIONS

Jaehn, Florian et al., Airplane boarding European Journal of Operations Research, vol. 244, 2015 (Year: 2015).*

(Continued)

*Primary Examiner* — Scott L Jarrett
(74) *Attorney, Agent, or Firm* — McCarter & English, LLP

(57) ABSTRACT

The present invention relates to a method characterized in that one or more passenger waves having a size corresponding to the number of passengers in the settling process, who may be standing at the same time in an aircraft aisle. The invention also relates to a system and equipment capable of performing a method according to the invention, in addition to corresponding computer programs.

5 Claims, 20 Drawing Sheets

(56) References Cited

U.S. PATENT DOCUMENTS

| | | | | |
|---|---|---|---|---|
| 8,618,909 B1* | 12/2013 | Clausen | ................. | G07C 11/00 340/5.2 |
| 9,187,176 B2* | 11/2015 | Boren | ................. | B64F 1/30 |
| 10,885,475 B2* | 1/2021 | Lang | ................. | H04L 67/55 |
| 11,037,074 B2* | 6/2021 | Taylor | ................. | G06Q 10/06 |
| 11,068,806 B2* | 7/2021 | Savian | ................. | G06Q 30/0633 |
| 11,145,015 B2* | 10/2021 | Savian | ................. | G06Q 50/14 |
| 2003/0189134 A1* | 10/2003 | Konya | ................. | B64F 1/305 244/137.2 |
| 2003/0189135 A1* | 10/2003 | Konya | ................. | B64F 1/305 244/137.2 |
| 2004/0119602 A1* | 6/2004 | Blum | ................. | A47L 23/22 340/815.4 |
| 2006/0206353 A1* | 9/2006 | Buschi | ................. | G06Q 10/00 705/5 |
| 2006/0278764 A1* | 12/2006 | Zhao | ................. | G07C 11/00 244/137.2 |
| 2007/0046426 A1* | 3/2007 | Ishibashi | ................. | G07C 9/257 340/5.82 |
| 2007/0265890 A1* | 11/2007 | Curtis | ................. | G06Q 10/06 705/5 |
| 2008/0097799 A1* | 4/2008 | Scribner | ................. | G06Q 50/14 705/5 |
| 2012/0018582 A1* | 1/2012 | Wallace | ................. | G09B 19/00 40/299.01 |
| 2013/0068890 A1* | 3/2013 | Boren | ................. | B64C 1/1423 244/137.2 |
| 2013/0268303 A1* | 10/2013 | Messier | ................. | G06Q 50/40 705/5 |
| 2015/0025920 A1* | 1/2015 | Stelling | ................. | G06Q 10/02 705/5 |
| 2015/0298823 A1* | 10/2015 | Cox | ................. | B64F 1/30 14/71.5 |
| 2016/0039539 A1* | 2/2016 | Cawley | ................. | G06Q 10/06 414/800 |
| 2016/0080913 A1* | 3/2016 | Thogersen | ................. | H04L 67/01 455/456.3 |
| 2017/0113801 A1* | 4/2017 | Brunaux | ................. | B64D 11/00 |
| 2019/0050758 A1* | 2/2019 | Kyllmann | ................. | G06Q 10/02 |
| 2019/0325356 A1* | 10/2019 | Savian | ................. | G06Q 10/02 |
| 2019/0325538 A1* | 10/2019 | Savian | ................. | G06Q 10/02 |
| 2023/0298122 A1* | 9/2023 | Pocai | ................. | G06Q 90/20 705/7.27 |

OTHER PUBLICATIONS

Erland, Sveinung et al., Lorentzian-geometry based analysis of airplane boarding policies highlights slow passengers first as better Physical Review, Vo. 100, 2019 (Year: 2019).*

Steffen, Jason H. et al., Experimental test of airplane boarding methods Journal of Air Transport Management, Aug. 29, 2011 (Year: 2011).*

Ferrari, P., et al, Robustness of Efficient Passenger Boarding Strategies for Airplanes Transportation Research Record, 2005 (Year: 2005).*

Van den Briel, M., H.L., et al., The aircraft boarding problem. IIE Annual Conference.Proceedings, 2003 (Year: 2003).*

Nyquist, David C. et al., A study of the airline boarding problem Journal of Air Transport Management, vol. 14, 2008 (Year: 2008).*

International Search Report based on International Application No. PCT/BR2019/050026, mailed May 30, 2019—4 Pages.

International Preliminary Report on Patentability based on International Application No. PCT/BR2019/050026—3 Pages.

* cited by examiner

# METHOD AND SYSTEM FOR PASSENGER INFORMATION, ORGANIZATION, LEADING, BOARDING AND SETTLING IN AIRCRAFTS, EQUIPMENT AND COMPUTER PROGRAMS THEREFOR

CROSS-REFERENCE TO RELATED APPLICATIONS

This application is a national stage application filed under 35 U.S.C. § 371 of PCT/BR2019/050026, filed Jan. 29, 2019, which is incorporated herein in its entirety by reference.

FIELD OF APPLICATION

The present invention is related to the field of data and information processing, planning, organization and resource allocation, as well as people transportation logistics.

INTRODUCTION

The present invention is related to a method and a system aimed at resource optimization through sorting and leading passengers in sequential waves formed by groups of passengers. Parameterization of each wave is made according to transportation means, number of passengers and aisles and their available seats and, especially, according to the occupied space of the aisles by passengers of each wave, in counterflow of the boarding direction while they are still are in the process of settling (standing and/or storing luggage and/or hand luggage and/or getting up again to allow for settling of another passenger and the like).

The present invention is also related to an equipment and corresponding computer program.

BACKGROUND OF THE INVENTION

The constant commitment generated by the need of simultaneously increasing efficiency, profitability and passenger satisfaction keeps airlines constantly and increasingly under pressure in a relentless pursuit of time optimization, especially reduced turn time.

While the boarding phase is only one component of a larger and more complex aviation process, it is one of the most critical and costly events. Substantial reduction in boarding times will reduce aircraft turn time and physical traffic flow of airports, which in turn lessens logistics and operational costs, reduces labor demand, improves ground equipment use, and reduces pollutant emissions.

As such, employing optimized boarding strategies benefits not only airlines, but also the environment, airport operators and, as a measure of passenger comfort and loyalty, since boarding processes directly and greatly influence passenger quality perception of the service provided.

Technical and logistic solutions aiding in the search for shorter boarding times and, as a whole, focusing on reduction of aircraft turn time, have challenged technicians and engineers worldwide for several years.

STATE OF THE ART

Several solutions for line organization, guiding and leading individuals in or from a line are known from the prior art, following a predetermined set of rules such as the solution disclosed by US Patent Document #US20060206353A1, which describes a method and system for intelligent line management that uses a virtual destination locator to guide any line members with pre-allocated final destination assignment. The guiding arranges the line members into a sequence and then guides them to the final destination by moving the virtual destination location in accordance with the sequence.

The method of US20060206353A1 essentially relates to managing the entry of line members through an entrance, comprising the steps of identifying a plurality of line members wherein each has an allocated final destination; mapping each final destination onto a virtual destination location; guiding each line member, using the virtual destination location, towards the corresponding final destination by the steps of determining a sequence in which the line members should pass through the entrance so as to not delay other line members in the sequence as each moves to their respective final destinations. Boarding sequence is determined by managing a row distant from the entry (row n) in relation to a row that is less distant from the entry (row m), not yet occupied by passengers, that is, always in groups of rows from a more distant row (n−1) to a less distant row (m−1), until all seats are occupied, following the occupying parameter of "from back to front".

It should be noted that the solution suggested in US20060206353A1 presents a few disadvantages. Although it provides constant updating of the instructions given to passengers, said system update depends on a specific instruction for a boarding conditions update, made by the airline's ground boarding staff manually or through a boarding card reader, because the system will only call the next group to board after a ground boarding agent (or equipment) reports that a particular group has boarded completely, which may slow down the flow.

The coding of the situation or condition of boarding using, for example, the abbreviations P, E, PBP and NS projected on the boarding plane and visible to passengers, in addition to making no difference, or being of no interest to passengers since each one will be occupied with their own boarding, may further confuse them and eventually lead to indecision and consequently delays in boarding.

In addition, as seen above, the update sequence always considers sequential row groups, which leaves no margin for safety and comfort in boarding. Considering the example of US20060206353A1 of an aircraft with rows from "m" to "n", the system and method begin by instructing passengers to board starting from a more distant row "n", for example, row 30, to a less distant row "m", for example, row number 26, thus beginning boarding with a set of rows, 30 ("n") to row 26 ("m"). After boarding from the most distant row "n" or 30, a boarding agent (or equipment) activates the upgrade. The system, after upgrading, calls passengers from rows "n−1" to "m−1" or 29 to 25, and after boarding of row 29 and further update by the boarding agent, it calls rows 28 through 24, and so on. This solution only considers passenger conditions at or near the aircraft entrance, disregarding settling conditions for passengers in the boarding region of the airport and those already boarded, and thus not solving the problem of space occupied by passengers in the aisle standing and/or storing luggage or carry-on items and/or standing up again to accommodate another passenger.

In addition, despite mentioning that the boarding plan is projected on the floor, US20060206353 A1 makes no reference nor suggests how the projection is to be made, and in particular how the projection update behaves if there is no movement by the passengers or in the event of displacement or movement not anticipated.

Another boarding sorting solution that repeats the above-mentioned passenger congestion and discomfort issues is disclosed in German patent document DE102009058848 A1, which discloses and describes a device for preparing passengers for sorted boarding into aircrafts, revealing a barrier-shaped device for guiding and directing passengers in a departure lounge according to boarding sequences, providing, but not detailing, the use of projections onto the ground, wall, ceiling, etc.

Patent WO201622209 A1 describes a method and apparatus for aircraft boarding, using ground projection of the seat configuration of the aircraft so that each passenger occupies their position in the departure lounge, then keeping with the sorting so as to board the aircraft from back to front and additionally from the window to the aisle. In addition to requiring considerable space in airport departure areas, the WO201622209 A1 solution is not concerned with the space condition of boarded passengers, it relies on specific commands in instructing/starting boarding and fails to describe how the upgrade of boarding conditions is made.

Similar boarding sorting conditions and consequently similar disadvantages are found in the solution disclosed by Chinese patent document CN104386261 B which, unlike the documents described above, provides for the use of a kind of mat or treadmill, which needs to be physically handled by ground crew, a condition whose drawbacks require no further detail.

Finally, the methods currently employed by airlines are also worth mentioning, ranging from standard single or multiple row boarding to boarding in groups or by category. The first type needs no further comment as it presents the obvious disadvantages of conventional boarding methods. On the other hand, boardings in groups or by categories, wherein boarding happens, for example, first for the passengers having seats by the windows, then intermediate seats and finally, aisle seats, as well as boardings which will subdivide the plane in two parts, rear and front, wherein boarding starts with passengers belonging to the rear and then to the front, also fail to eradicate passenger obstruction and long waiting times, considering ground time spent standing and sitting, as well as inside the aircraft.

It should be noted that none of the relevant state of the art methods allows the passenger in a boarding situation to concomitantly, (i) know or understand his/her turn of entry into the aircraft, (ii) dispose of flexible and sufficient physical space for movement both in and off the aircraft; and (iii) be able to reach their position prior to boarding (and then their seat) without delaying boarding.

Finally, it is necessary to emphasize that none of the solutions known from the state of the art mentioned above is intuitive enough to make boarding a simpler task for passengers, improving the user experience with the airline and relieving crews and boarding agents on the ground.

As can be inferred from the previous descriptions, there is room for a method and system that overcomes the deficiencies of the state of the art, aiming at optimization of resources through improved sorting and leading of passenger boarding.

Objectives of the Invention

One of the objectives of the present invention is, therefore, to provide a method and a system able to overcome the deficiencies of the state of the art whilst being a simple and cost-effective solution, intuitive for the user and the operator, easy to install, which is also flexible and adaptive, avoiding clashes with the pre-existing airport infrastructure, being thus capable of reducing passenger waiting time, facilitating sorting and leading of passengers and their subsequent boarding and, above all, reducing the aircraft turn time.

Yet another objective of the present invention is an equipment that comprises the system according to the invention and is capable of carrying out a method according to the invention.

Lastly, another objective of the present invention is to provide corresponding computer programs.

BRIEF DESCRIPTION OF FIGURES

For better understanding and visualization of the object of the present invention, it will now be described with reference to the attached figures, representing the technical effect obtained through exemplary embodiments, which are not limiting to the scope of the present invention, wherein, schematically (the arrows indicate the direction and orientation of passenger movement).

DETAILED DESCRIPTION OF THE INVENTION

Method

Figure 1:
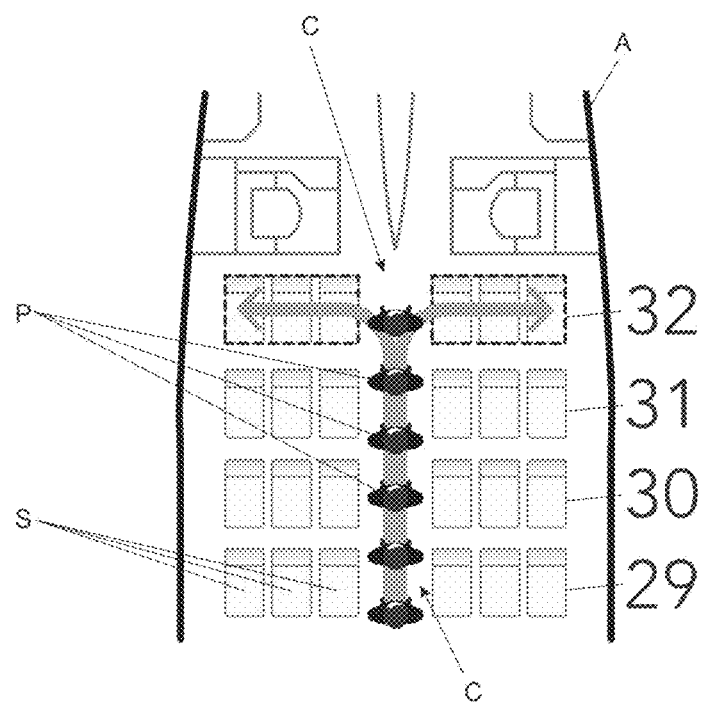
FIG. 1: shows a partial top view of the interior of an aircraft, representing the start of an exemplary boarding procedure for a first group of a first wave in a first row (highlighted with a dashed frame), according to the method of the invention.

A method according to the invention is a method for passenger information, organization, leading, boarding and settling in collective transportation means.

The method aims at resource optimization through passenger boarding in sequential waves formed by groups of passengers.

Sequential waves, in the context of the invention, are sets of one or more groups of people with qualitative and quantitative characteristics determined according to the nature of the transportation means, that is, the number, grouping and physical arrangement of the seats available within the transportation means.

In addition to accounting for common factors in boarding procedures, parameterization of the waves by the method of the invention considers the space occupied by passengers of each wave in the aircraft's aisles, while they are still in the process of settling.

Settling process, in the context of the invention, should be understood as any intermediate passenger situation, from entry into the aircraft to final seat occupation. This includes, for example, situations comprising one or more passengers still standing and/or storing hand luggage and/or belongings and/or standing up again to allow passage for another passenger and/or any similar intermediate conditions.

Boarding by the method of the invention is preferably initiated by the last row of seats or the row of seats which is furthest from the access to the aircraft. This goes for front or rear boarding, as well as front and rear boarding and, finally, for boarding when there are more than two access doors, in which case necessary adaptations must be made.

That said, a first wave of passengers according to the invention will be that which is composed of one or more passenger groups and intended to start occupying seats from the row farthest from the aircraft entrance, considering the boarding counterflow and having a maximum number of passengers obviously limited to the number of seats in said last row.

In the context of the present invention, the concept "all seats" includes all seats sold and/or reserved that, in some way, can be occupied according to a passenger or boarding or occupancy list. However, the present method can be designed considering effectively all seats, regardless of the aircraft's occupancy rate, without harming boarding, since passengers will immediately notice the vacancy of one or more seats in their row.

The present method can also be applied considering the aircraft's occupancy rate or specific occupancy conditions, for example, skipping rows and/or empty seats when forming the groups.

To ensure passenger comfort and, in particular, to make it so that boarding procedure is the fastest possible, boarding of the first group will be followed by a second group having, at first but not necessarily, the same maximum number of passengers as the first group, which will occupy, in counterflow boarding direction, a next row at a distance from the row of the first group such that it allows simultaneous permanence, in a line (in line and/or side by side and/or one after the other), of all passengers of the first group in the aircraft aisle (C), which would be the worst case in terms of movement and settling.

Figure 2:
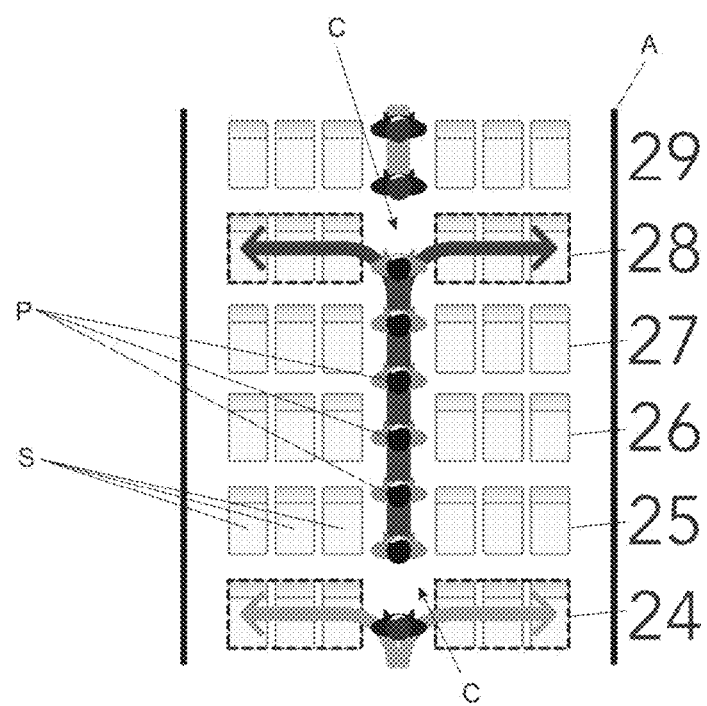
FIG. 2: shows the aircraft in FIG. 1 when the second group of the first wave is boarding (row highlighted with a dashed frame), just after the first group, and, right after, the start of boarding for the third group (row highlighted with a dashed frame)
Figure 3:
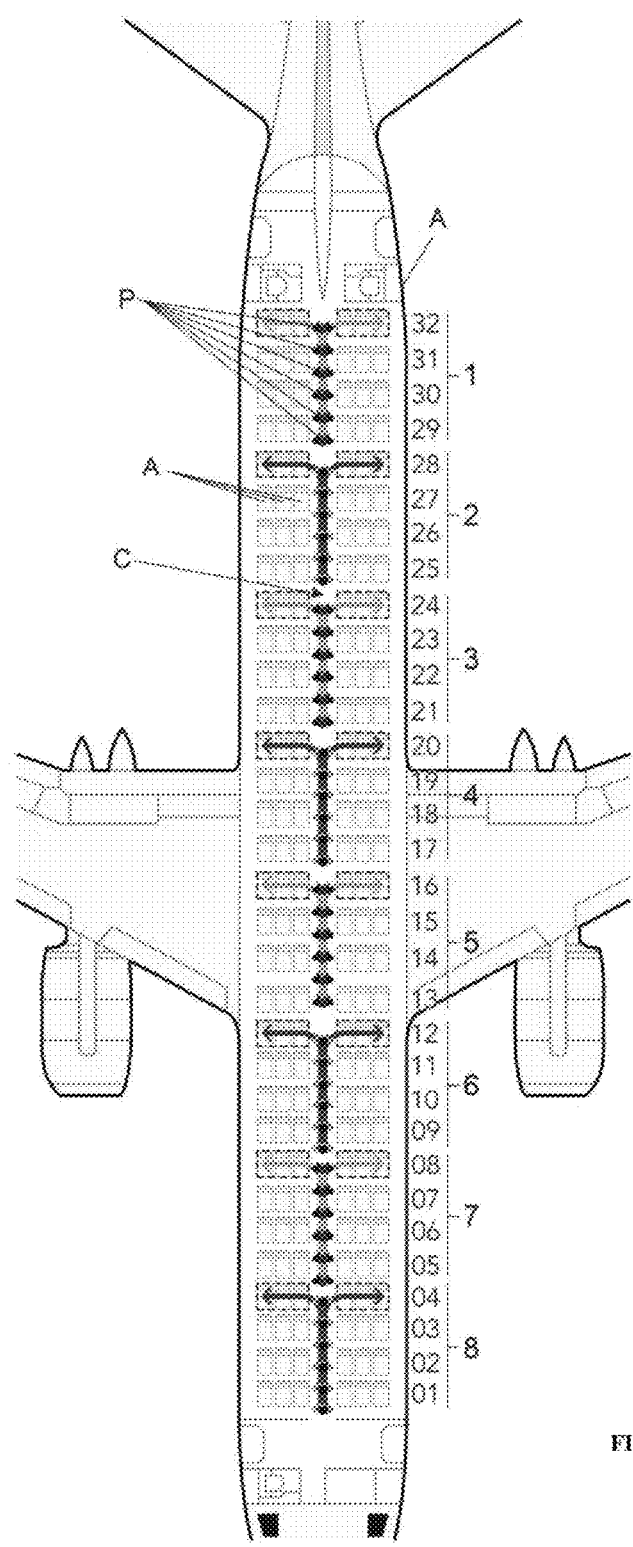
FIG. 3: shows a partial top view of the interior of the aircraft from the example in FIG. 1, showing that each wave according to the invention has a size corresponding to the number of passengers in the settling process who may be standing at the same time in the aircraft aisle.

In practical terms and considering a non-limiting example, an aircraft (A) with 32 (01 to 32) rows having 6 seats (S) each, the spacing between rows being of 0.75 meters and with passengers (P) standing in the aisle (C) occupying, on average, a space equivalent to one circumference of 0.5 meters in diameter around them, will have a first group of up to 6 passengers (P) destined to occupy the seats (S) of row 32 (FIG. 1), and a second group, also having up to 6 passengers (P), destined to occupy a row that is at least 6 passengers (P) away in the conditions described above, therefore, at least 3 meters or 4 rows away from row 32, that is, to occupy row 28 (FIG. 2). Similarly, a third group will occupy row 24, a fourth group row 20, a fifth group row 16, a sixth group row 12, a seventh group row 08 and an eighth group row 04, thus completing boarding for the first wave, totaling 48 passengers (P) boarded in sequences of 8 (1, 2, 3, 4, 5, 6, 7, 8) groups of 6 people (P) in each group (FIG. 3).

Figure 4:
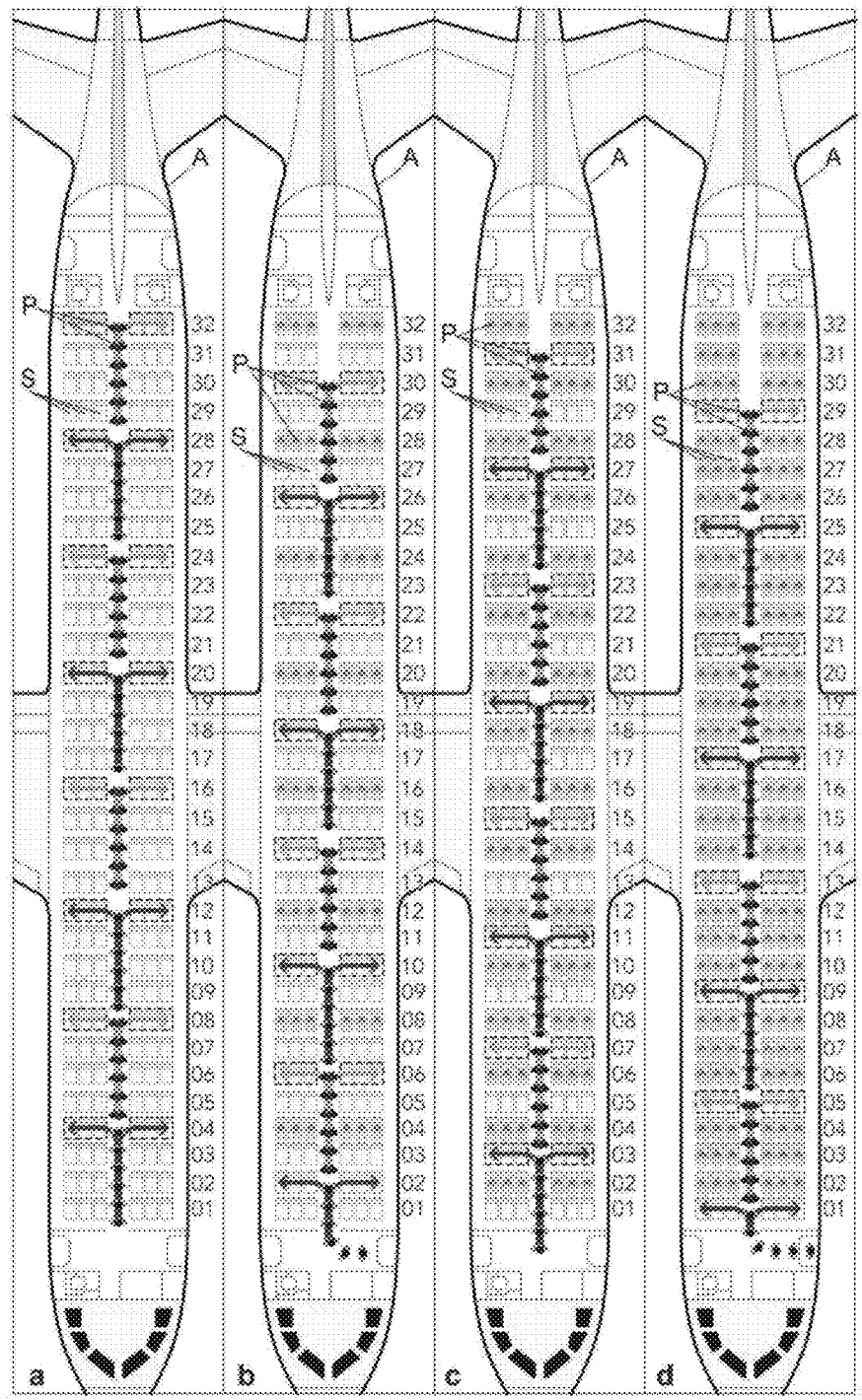
FIG. 4: shows a partial top view of the interior of the aircraft from the example in FIG. 1, representing the sequence (a, b, c, d) of four waves necessary to fill the aircraft in the example, 6 passengers boarding for every 24 seats, in a scheme called herein 6 by 24.

In the example above, therefore, 4 waves are needed to fill the aircraft (A), with 6 passengers (P) boarding every 24 seats (S), in a scheme herein referred to as 6 by 24 (FIG. 4, sequences a, b, c, d, which correspond to sequences of the $1^{st}$, $2^{nd}$, $3^{rd}$, and $4^{th}$ wave, respectively).

Figure 5:
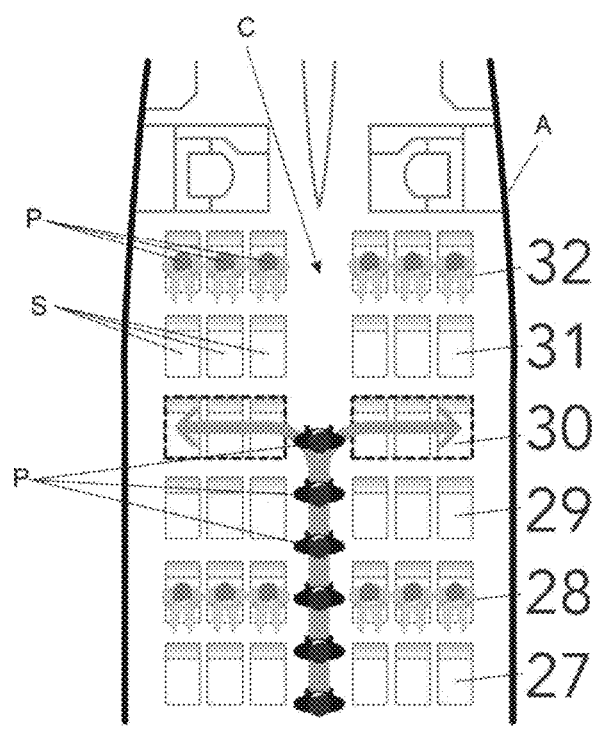
FIG. 5: shows the aircraft from the example of FIG. 1, representing boarding of the first group of the second wave while the passengers of the first wave are all already settled.
Figure 6:
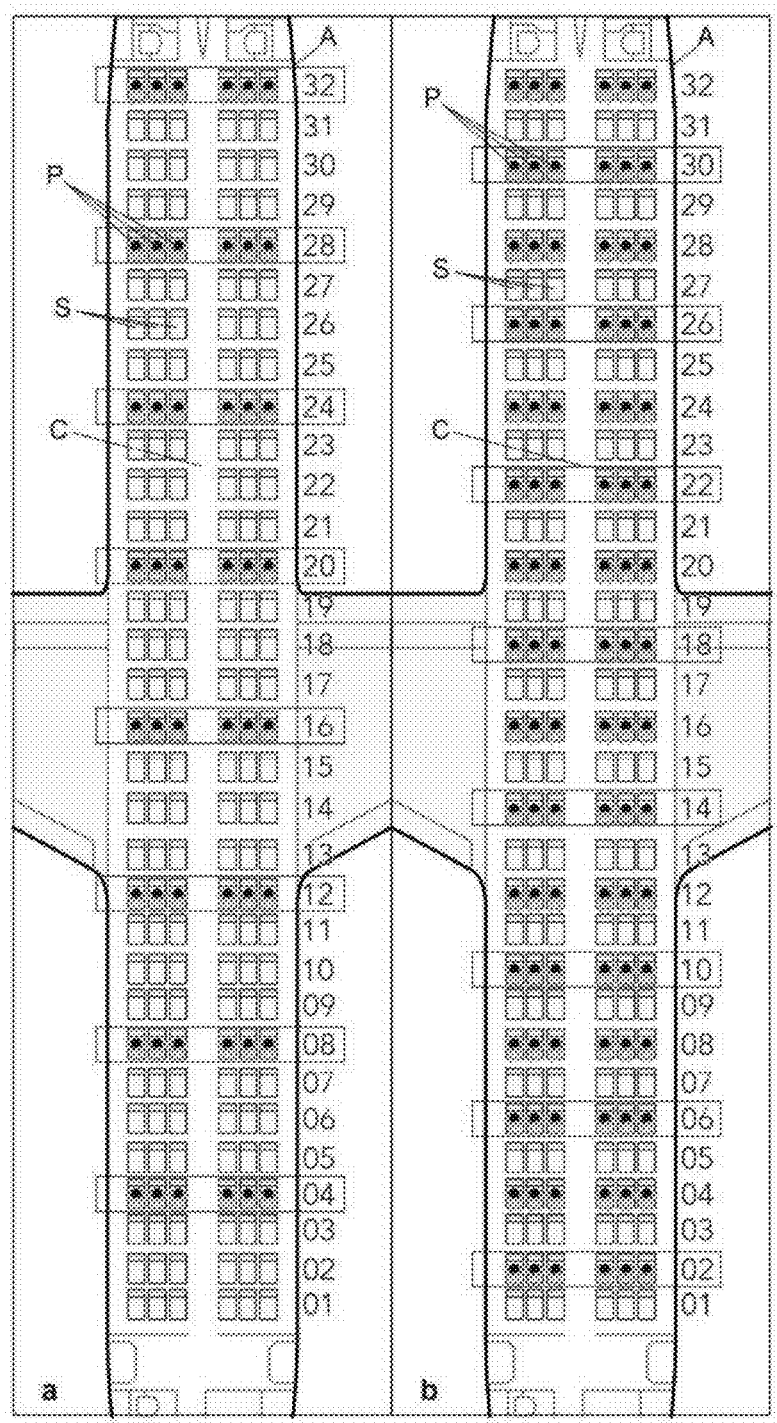
FIG. 6: shows a partial top view of the interior of the aircraft from the example in FIG. 1, representing the sequence (a, b) of the first two waves and highlighting the respective groups, representing sequential settling of the passengers.

Then, a second wave will follow the same standard as the first wave, being also made up of 8 groups, each formed by 6 passengers (P), the first group intended to occupy the next row furthest from the aircraft (A) entrance, in the counterflow direction, preferably skipping one of the rows and, preferably, the next row of an even number (if the first wave started with an even-numbered row) or an odd number (if the first wave started with an odd-numbered row). That is, it should preferably start with the seats (S) in row 30 (FIG. 5), being followed by the other groups so as to occupy, according to the rule of the first wave, rows distant enough to allow passengers (P) from the previous groups to have room in the aisle (C), that is, rows 26, 22, 18, 14, 10, 06 and 02, boarding of the second wave being concluded with 48 passengers (P), totaling 96 passengers (P) on board (FIG. 6), and settled.

Figure 7:
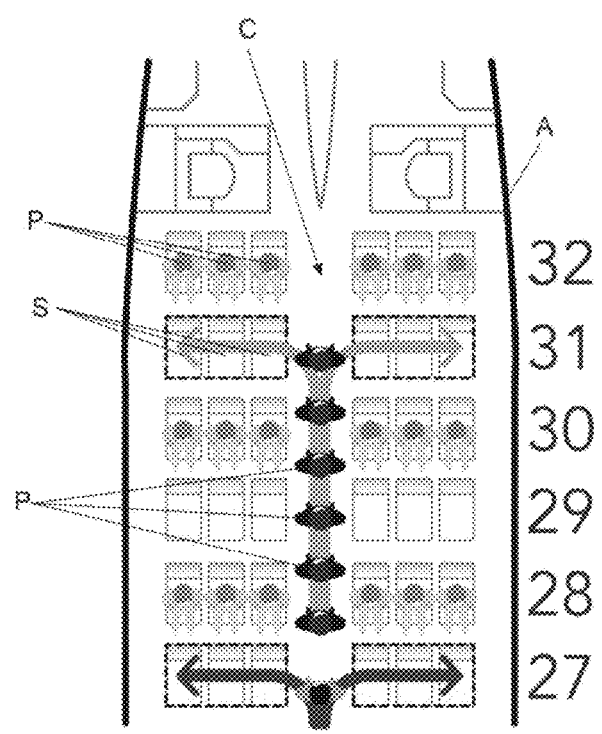
FIG. 7: shows the aircraft from the example in FIG. 1, representing boarding of the first group of the third wave while the passengers of the first and second waves are all already settled.
Figure 8:
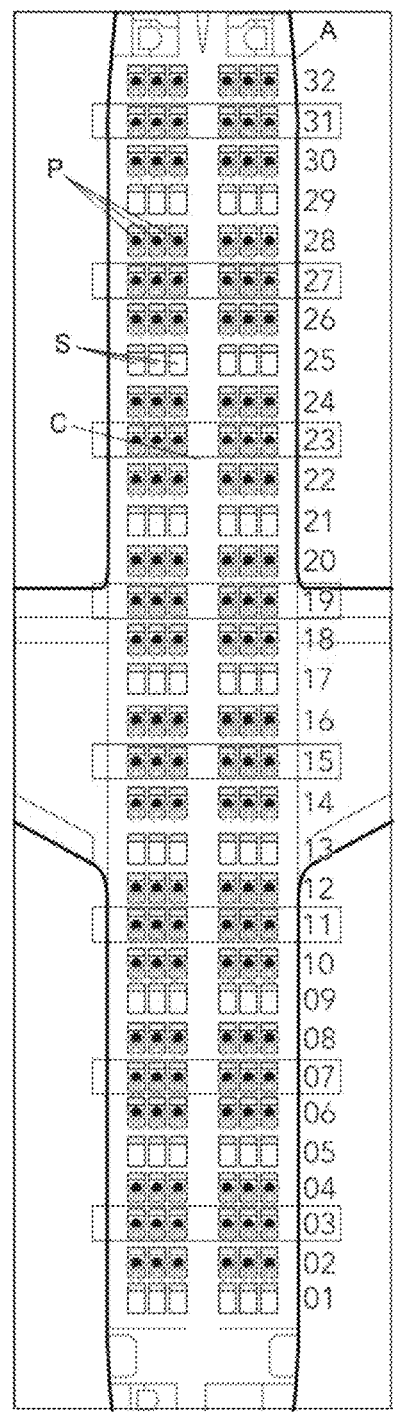
FIG. 8: shows a partial top view of the interior of the aircraft from the example in FIG. 1, highlighting the respective groups of the third wave while passengers of the first and second waves are all already settled.

Then, a third wave will follow the same structure as the previous waves, being made up of 8 groups, each formed by 6 passengers (P), boarding for the first group intended to occupy the next row furthest from the aircraft (A) entrance, in the counterflow direction, preferably skipping one of the rows and, preferably, the next row of an odd number (if the first wave started with an even-numbered row) or an even number (if the first wave started with an odd-numbered row). That is, it should preferably start with the seats (S) in row 31 (FIG. 7), being followed by the other groups so as to occupy, according to the rule of the first wave, rows distant enough to allow passengers (P) from the previous groups to have room, that is, rows 27, 23, 19, 15, 11, 07 and 03, boarding of the third wave being concluded with 48 passengers (P), totaling 144 passengers (P) on board (FIG. 8) and settled.

Figure 9:
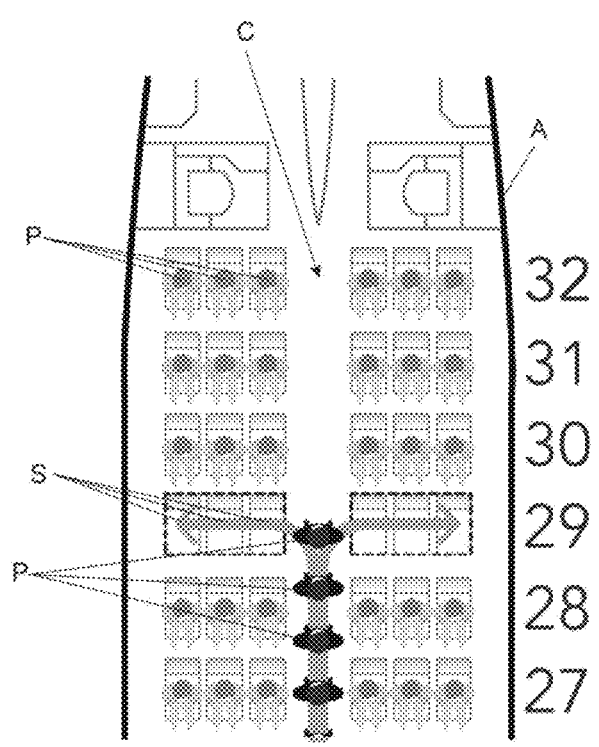
FIG. 9: shows the aircraft from the example of FIG. 1, representing boarding of the first group of the fourth and last wave while the passengers of the first, second and third waves are all already settled.
Figure 10:
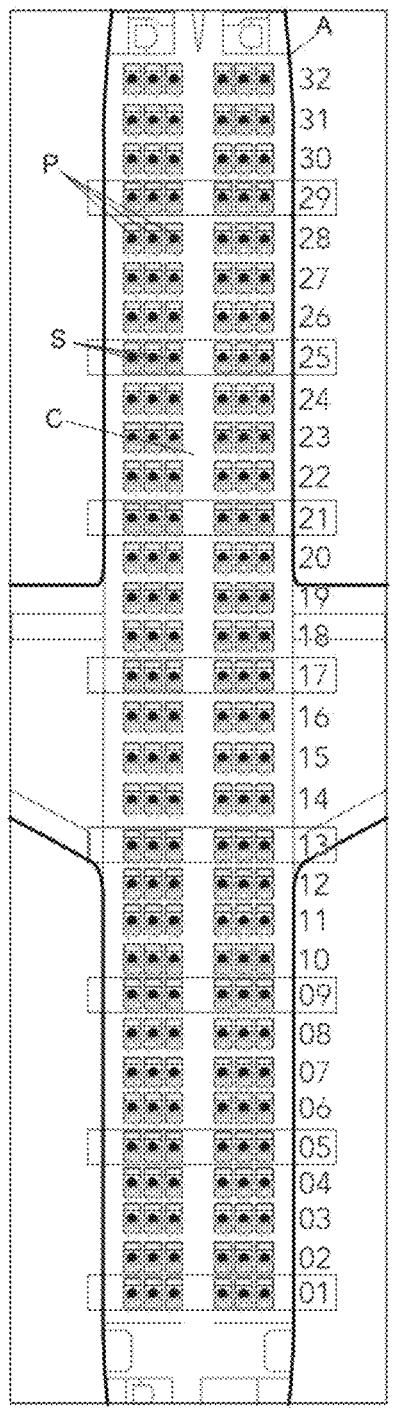
FIG. 10: shows a partial top view of the interior of the aircraft from the example in FIG. 1, highlighting the respective groups of the fourth and last wave, thus ending the physical boarding procedure according to the invention.

The fourth and last wave will follow the same standard as the previous waves, being also made up of 8 groups, each formed by 6 passengers (P), starting with the next row furthest from the aircraft (A) entrance, in the counterflow direction, preferably skipping one of the rows and, preferably, with the next row of odd number (if the third wave started with an odd-numbered row) or an even number (if the third wave started with an even-numbered row). That is, it should preferably start with the seats (S) in row 29 (FIG. 9), being followed by the other groups so as to occupy, according to the rule of the first wave, rows distant enough to allow passengers (P) from the previous groups to have room, that is, rows 25, 21, 17, 13, 09, 05 and 01, boarding of the fourth wave being concluded with 48 passengers (P), totaling 192 passengers (P) on board and settled, thus concluding the process of passenger boarding (FIG. 10).

Figure 11:
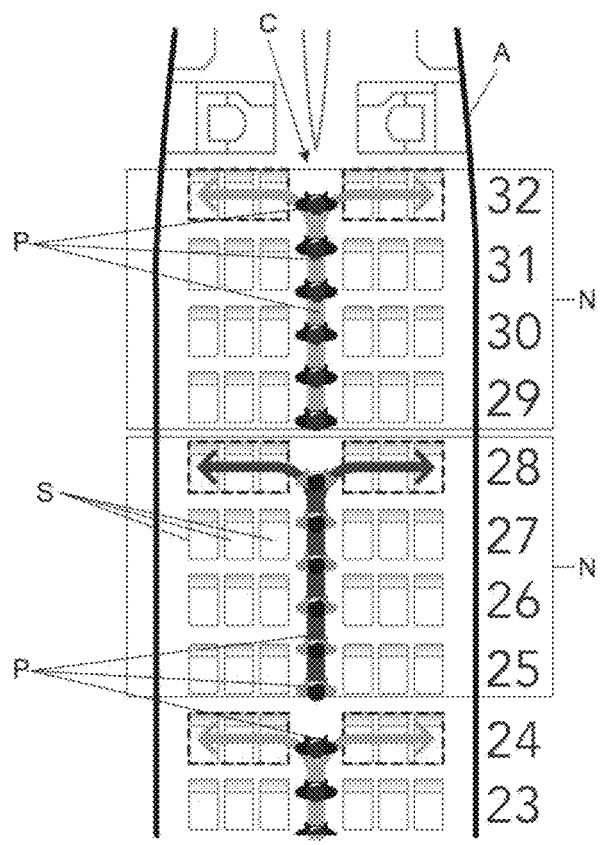
FIG. 11: shows a partial top view of the interior of the aircraft from the example in FIG. 1, evidencing that the distance between the first rows of each group in each wave creates specific events for each group, preventing confrontation between passengers from different groups, ensuring passenger comfort as well as boarding promptness, as it respects the room between rows of seats needed so that the total number of people in each group can settle properly.

It should be noted that the distance between the first rows of each group in each wave creates specific events (N) for each group, preventing confrontation between passengers (P) from different groups, ensuring passenger (P) comfort as well as boarding promptness, as it respects the room between rows of seats needed so that the total number of people (P) in each group can settle themselves properly (FIG. 11).

Confrontation, in the context of the invention, means any situation that results in delays or creates discomfort for passengers, waiting caused by passage blockages or situations in which one or more passengers stand up so that another passenger can be seated.

It is also worth noting that the distance between the initial rows of each wave leaves room for maneuvering in case of an unforeseen event, such as a passenger in a longer-than-normal settling process and still standing, for example, still collaborating to boarding promptness.

In the method of the invention, the possibility of confrontation between passengers in boarding situations is reduced to just one confrontation, possible between subsequent waves, that is, there may be a confrontation by wave, between the last passengers of a wave and the first passengers of the next wave.

The process of alternating between odd or even waves, two by two, may vary according to the features of each aircraft, and must be tailored to the general conditions of each application. Alternating rows by side and/or aisle (C) of the aircraft can also be considered.

If the aircraft has rows with different seat numbers and/or rows with different distances and/or seating configurations, as is the case, for example, in the regions near the airplane's emergency ends or exits, or for subdivision of room into classes (first class, business class, economy with additional room, economy, etc.), the row with the largest number of seats can be considered as the basis for calculations, it is also possible to assign waves and groups with different sizes, considering these conditions.

To illustrate the situation of rows having different seat (S) numbers and/or rows having different distances and/or seat (S) configurations, we will take as an example an aircraft (A) with the configuration of 30 rows in economy class having, each row, two sets of 3 seats (S) next to the respective windows and a set of 4 seats (S) in the center of the aircraft (A), with an aisle (C) between each group of 3 and 4 seats (S), with a distance of at least 0.8 m between each row. In this case, the method of the invention suggests forming groups of 10 passengers each, for example, depending on the situation, each group can be divided into subgroups, one for the right aisle (C) and another for the left aisle (C). Each group would have 10 passengers arranged in intervals of 3 rows of seats (S), making up to 10 groups per wave. Thus, a first wave would call passengers in rows 30, 27, 24, 21, 18, 15, 12, 09, 06 and 03, respectively, the second wave would be formed by passengers in rows 29, 26, 23, 20, 17, 14, 11, 08, 05, 02 and finally the last one would be formed by rows 28, 25, 22, 19, 16, 13, 10, 07, 04 and 01. In this way, 10 passengers will be boarded every 30 seats (S), in a 10 by 30 scheme. It should be noted that in this example, there was no need to alternate between odd and even, thus demonstrating the flexibility and versatility of the method.

An example of the situation of subdividing the aircraft (A) room into classes (first class, business class, economy with additional room, economy, etc.) may be that of an aircraft (A) with the first class formed of 4 rows having 4 seats (S) each, with row spacing higher than conventional or different from usual. According to the method, following the logic explained above, 2 waves of 2 groups would be formed, the first wave being of rows 04 and 02 and the second wave of rows 03 and 01, boarding 4 passengers every 8 seats (S), in a scheme called herein 4 by 8.

Therefore, it is possible to also group the waves and promote boarding of the waves by class of the same aircraft (A).

The method of the invention, therefore, is flexible and makes it possible to expedite boarding for any type and model of aircraft (A) and practically all seat (S) configurations, also allowing for variations in accordance with specific needs.

The example of boarding 6 passengers for every 24 seats (S) shown initially for an aircraft (A) with 32 rows of 6 seats (S) each, can also be applied to a 24-row aircraft (A) with 6 seats (S) each (4 waves of 6 groups), while this same aircraft (A) configuration can be loaded with 6 passengers every 36 seats (S) (6 by 36), that is, in 6 waves of 4 groups each, with a first wave formed by seats (S) 24, 18, 12, 06, the second by seats 22, 16, 10, 04, the third by seats 20, 14, 08, 02, the fourth by seats 23, 17, 11, 05, the fifth by seats 21, 15, 09, 03 and the sixth by seats 19, 13, 07, 01. This variation in the boarding scheme will depend on several factors, such as the distance between rows and the room for each passenger standing in the aisle (C).

It should also be noted that sequential waves on a same boarding process can have different group numbers, for example, in an aircraft (A) with 29 rows of 6 seats (S) each, the waves can be formed by groups with, respectively, seats (S) 28, 24, 20, 16, 12, 08, 04, then 26, 22, 18, 14, 10, 06, 02, then 29, 25, 21, 17, 13, 09, 05, 01 and, finally, 27, 23, 19, 15, 11, 07, 03, thus having 3 waves with 7 groups and 1 wave with 8 groups. It should also be noted that in this case, boarding did not start from the last row, proving, once again, the flexibility and versatility of the method of the invention. This example refers to boarding of 6 passengers for every 24 seats.

The same aircraft (A) configuration as in the example above, and also depending on the distance between the rows and the room for each passenger standing in the aisle (C), can be boarded by a scheme of 6 passengers for every 36 seats (S), with the waves being formed by groups with, respectively, seats (S) of rows 28, 22, 16, 10, 04, then 26, 20, 14, 8, 02, then 24, 18, 12, 06, then 29, 23, 17, 11, 05, then 27, 21, 15, 09, 03 and, finally, 25, 19, 13, 07, 01, thus having 5 waves with 5 groups and 1 wave with 4 groups.

It should be noted that the method according to the invention is simple and intuitive, easily understood by the passenger, eliminating any and all additional tools for leading passengers, complementary codes or signals, legends, instructions and, noticeably, does not require the passenger to be connected to any devices or assisted by the ground crew.

Each wave corresponds to the total number of passengers who may stand at the same time in the aircraft's (A) aisle (C), with enough room for everyone to stand and/or settle at the same time, with the confrontation between passengers being possible only between subsequent waves.

In addition, the method of the invention does not require intermediate commands and additional control and supervision services by the boarding agents, since the lines formed will be of short duration and automatically dissipated following the forward pace of the last passenger of the last group of a wave, that is, as the last passenger of each wave settles.

System

A system according to the invention is a system for passenger information, organization, leading, boarding and settling in collective transportation means, which aims to optimize resources by boarding passengers in sequential waves formed by groups of passengers, therefore, assisting in carrying out a method according to the invention.

The system of the invention presupposes an airport physical structure and at least one boarding region of the airport physical structure, being basically composed of a main unit comprising one or more data processing centers, one or more databases, one or more information presentation equipment and other devices and/or equipment that enable its operation for perfect integral and/or partial carrying out of the method according to the invention.

A data processing center is an electronic processor, preferably a computer equipped with a connection to a data network and a remote database or an information storage and retrieval means, local and/or centralized and/or decentralized and/or in the cloud, and also equipped with all the usual peripherals of the state of the art, being able to exchange information with electronic and physical means, interfaces, applications, mobile equipment, etc.

The data processing center can be connected to the airport's data and communication network, the internet, the cloud, computer terminals, mobile devices, phone devices, ticket and boarding pass readers, credit cards, NFC or BLE devices, check-in counters, travel agencies, in short, to any equipment or interface directly or indirectly necessary to implement the method of the invention.

An information presentation equipment (100) is any set of visual signaling formed by devices capable of projecting (110) and/or emitting and/or presenting images and lights and of emitting visual and audible signals in general, being directly connected to the data processing center. The information presentation equipment (100) can also comprise auxiliary support monitors (130) distributed throughout the airport infrastructure environments.

Figure 12:
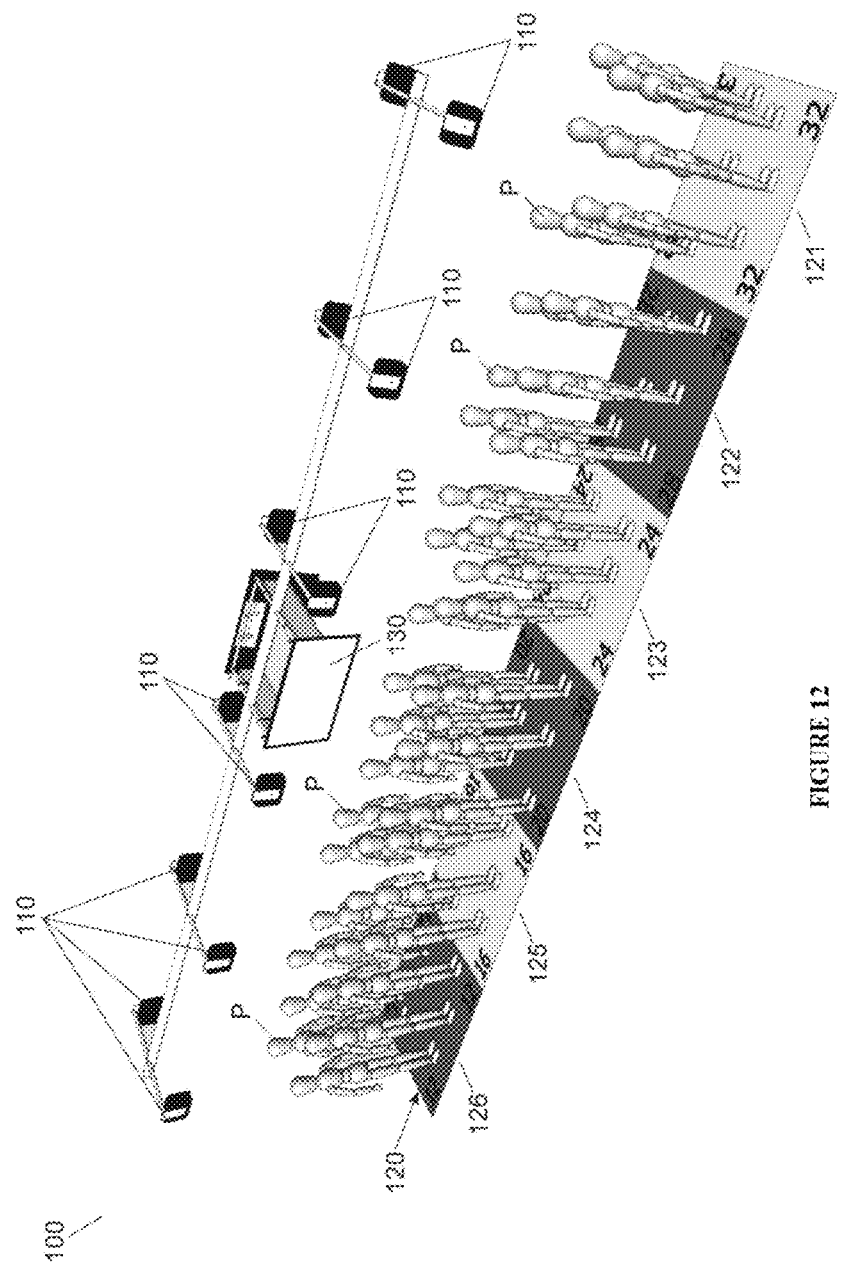
FIG. 12: shows a partial perspective view of a virtual guide that indicates the boarding sequence according to the method of the invention.

The information presentation equipment of the invention (100) is a virtual guide or dynamic mat (120) that indicates the boarding sequence according to the method of the invention, being disposed directly on the ground and/or projected on the ground by means of projectors (110) located above or under the passengers (P). The number of projectors (P) above or under passengers is such that shadows or regions with poor presentation are not formed (FIG. 12).

The virtual guide (120) has the form of a dynamic mat formed by adjacent cloths (121, 122, 123, 124, 125, 126) and that accompanies the movement of passengers (P) in an adaptive way, in that sensors on the ground and/or above and/or laterally to the passengers (P), together with a computer program or application, boarded or accessed via a data processing center, identify, count and sort the number of people (P) on/in the virtual guide (120), detecting their movement and following the flow and speed of each passenger (P) and of the set of passengers (P), following with the boarding sequence instructions in real time, according to the monitored flow and speed.

The virtual guide (120) is placed in the boarding area of the airport physical structure, preferably in the airport lounges next to the boarding gates, wherefrom boarding coordination is carried out according to the method of the invention.

The virtual guide (120) will basically present to passengers (P) the procedure instructions and indications according to the method of the invention, that is, it will present, sequentially, the numbers of the seats (S) and/or rows and/or waves and/or groups to be boarded, according to each situation and boarding scheme chosen.

Figure 13:
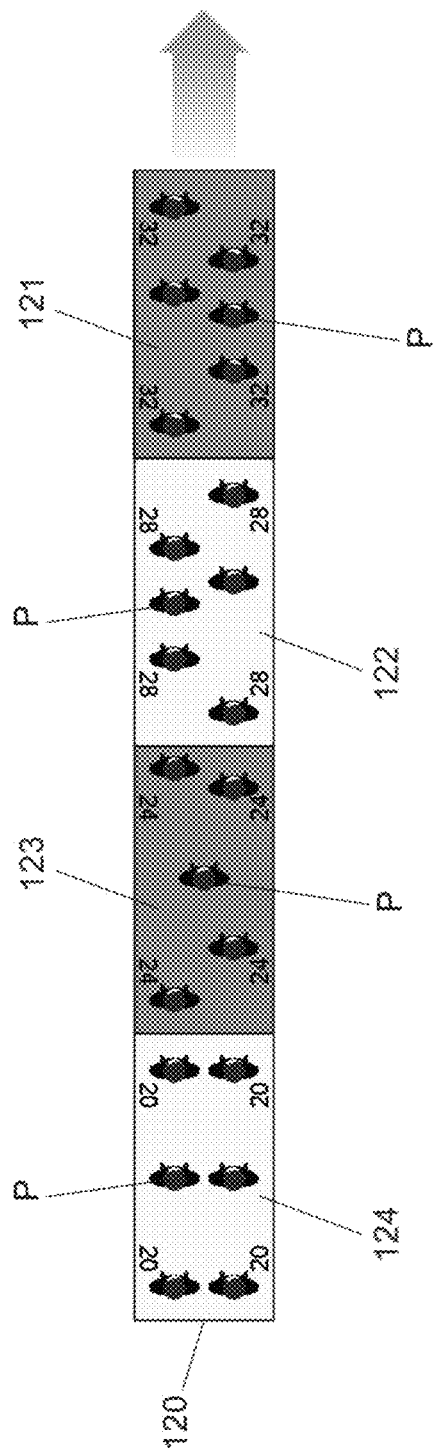
FIG. 13: shows a partial top view of the virtual guide in FIG. 12.

Therefore, passengers (P) belonging to the first group of the first wave will be the first to receive instructions from the virtual guide (120) to proceed to the boarding gate and present themselves to boarding control, having the number of their rows and/or their respective seat (S) numbers projected or presented in the virtual guide (100), having, individually or in group, reserved room for them to position themselves in the boarding region of the physical airport structure (FIG. 13).

Figure 14:
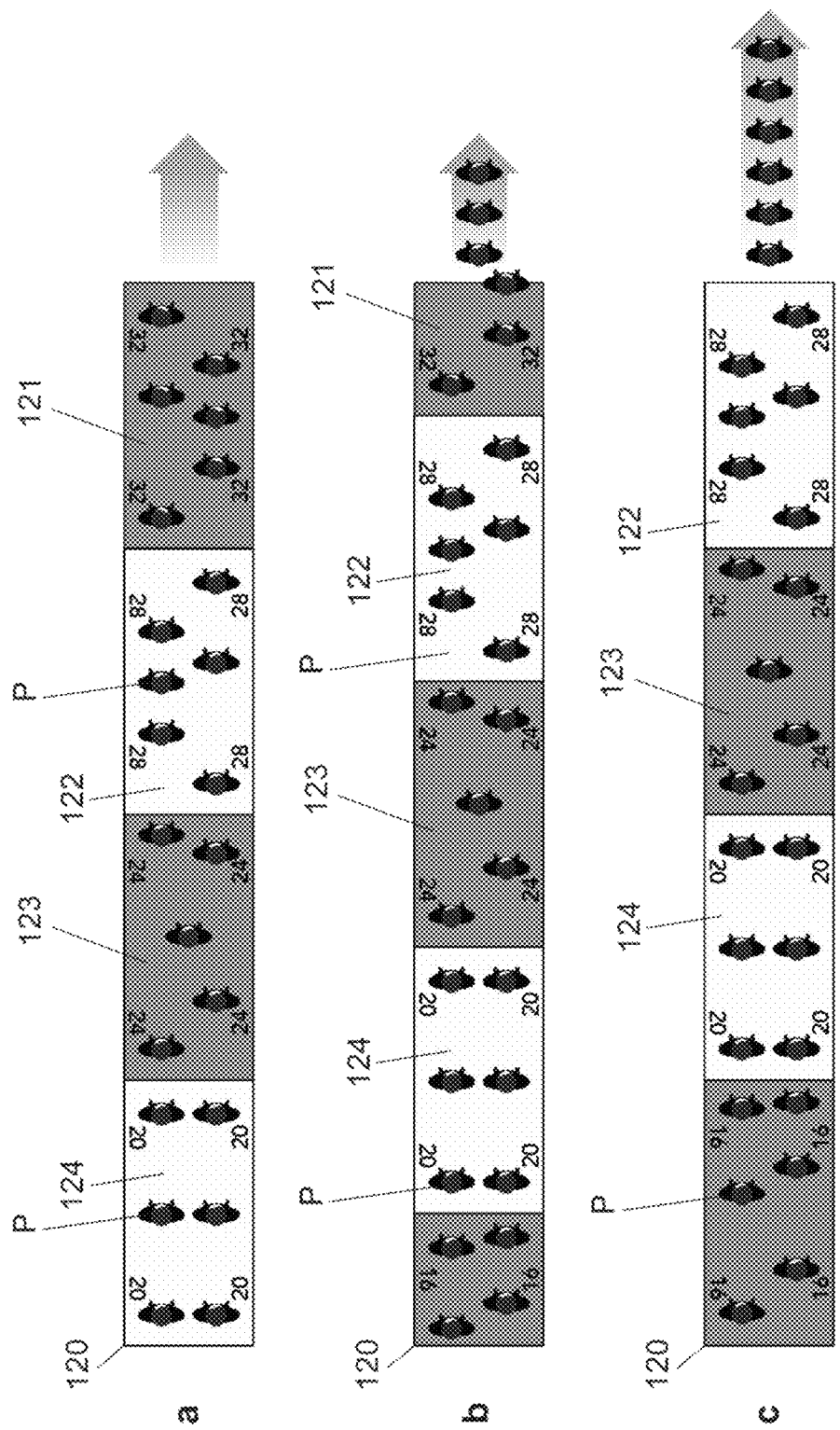
FIG. 14: shows the virtual guide of FIG. 13, evidencing that as passengers move on the virtual guide towards the departure gate, it follows with the numbers of the next passengers like a dynamic mat, inducing passengers to move forward on the virtual guide (sequences a, b and c).

As passengers move on the virtual guide (120) towards the departure gate, it follows with the numbers of the next passengers (P) like a dynamic mat (120), inducing passengers to move forward on the virtual guide (120) (FIG. 14).

Using the same example above involving wave boarding a 192-seat aircraft (A), with 32 rows of seats (S) with 6 seats (S) per row, single aisle (C), and adopting a 4-wave boarding model, one can imagine a virtual guide (120) with measures of 1.20 meters wide by 10.00 meters long.

Figure 15:
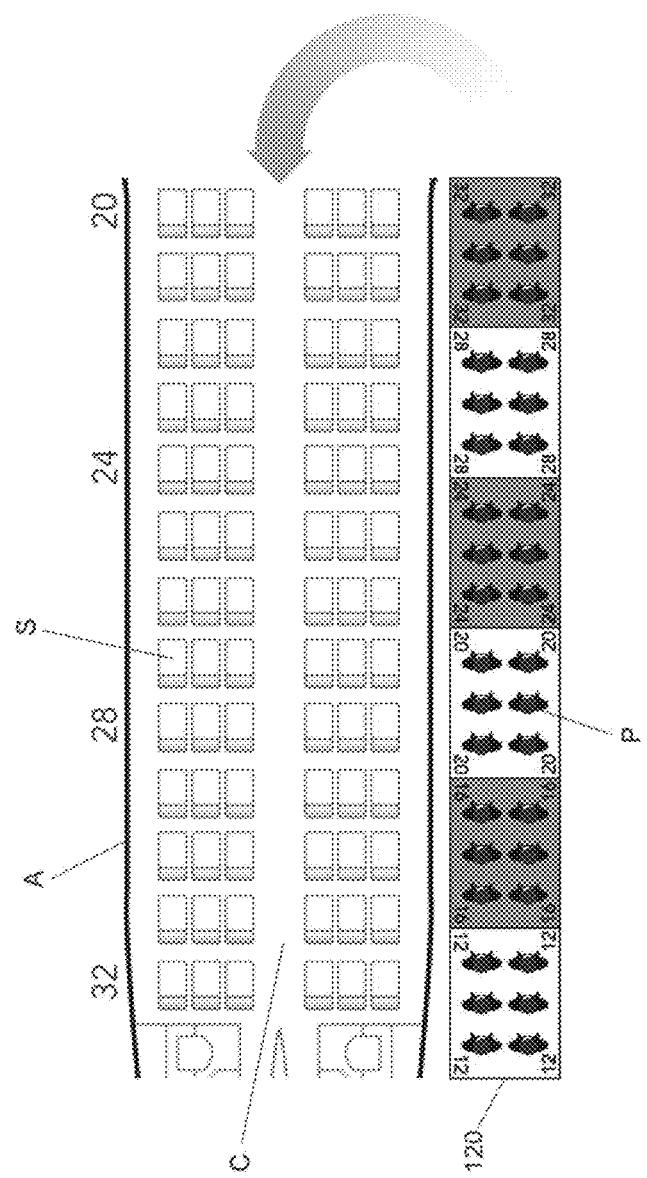
FIG. 15: shows the virtual guide in FIG. 13 in the example of wave boarding in a 192-seat aircraft, with 32 rows of seats having 6 seats per row, with single aisle, and adopting a 4-wave boarding model, schematically representing the sequence for advancing the first wave passengers on the virtual guide towards the interior of the aircraft.

The virtual guide (120) initiates projection or presentation of an initial cloth (121) of a certain color and/or initial visual pattern, measuring 1.20 meters wide by 1.80 meters long, for example, with the indicative numbering of row 32 (first wave of the first group in the example used). In this shape and size, there is enough room to accommodate the 6 passengers (P) in said row 32. Immediately after this first cloth (121), another cloth (122), adjacent, in color and/or visual pattern different from the first cloth (121), is projected, in order to facilitate the distinction and draw the attention of passengers (P), with indicative numbering for row 28, where the 6 passengers (P) of row 28 will be, and after that, another cloth (123) indicative of row 24 will be projected, and, in sequence, another cloth (124) for row 20, another cloth (125) for row 16 and another cloth (126) for row 12, preferably alternating colors and/or visual pattern, accommodating, thus, 36 passengers (P) in that first static image of the virtual guide (120) (FIG. 15). Remaining passengers (P) must stay close to the virtual guide (120), waiting for their positions to be indicated in the virtual guide (120). It is important to note that this virtual guide (120) can have different measures to have a greater number of cloths (121, 122, 123, 124, 125, 126), accumulating more passengers (P) and/or providing more room and comfort for passengers (P).

Figure 16:
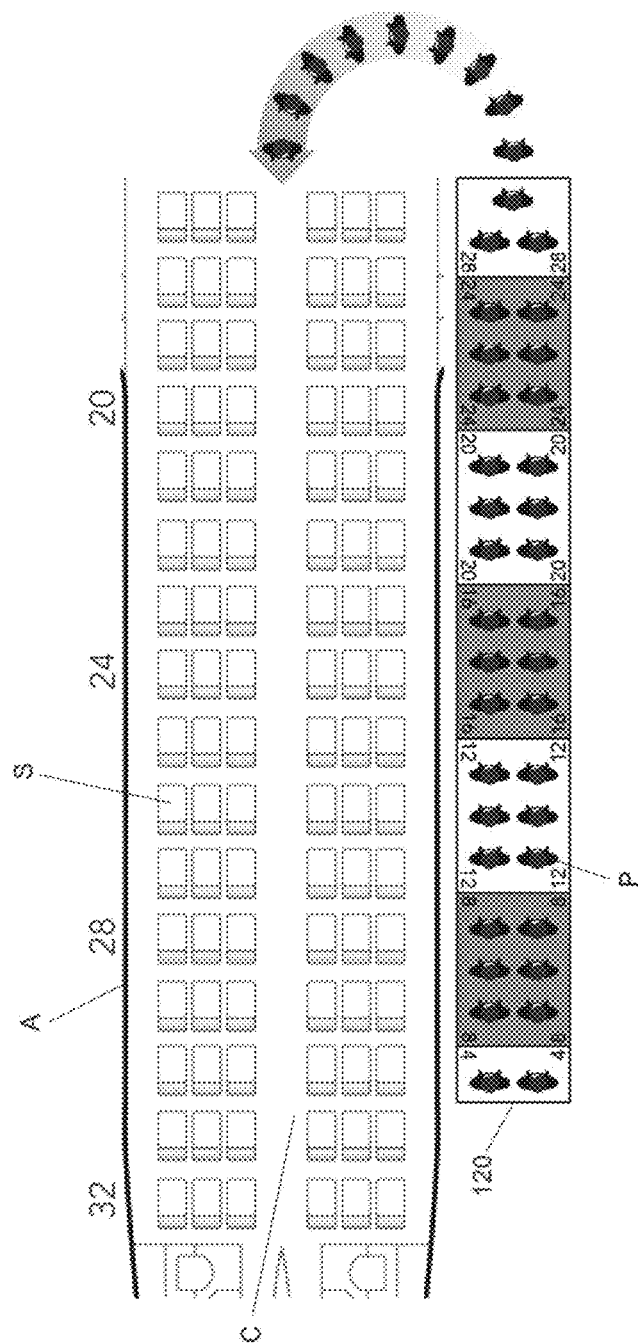
FIG. 16: shows the virtual guide in FIG. 15, schematically representing the organic movement of the virtual guide according to the sequence for advancing the first wave passengers on the virtual guide towards the interior of the aircraft.

When boarding begins, the first passengers (P) located in row 32 will begin to move on the virtual mat (120) towards the boarding gate, and only after the passenger (P) positioned in the last position of the screen 32 begins to move, will the final division of cloth 32 start moving, thus reducing the length of the cloth of row 32 and increasing the size of the next cloth, that is, of the cloth corresponding to row 28 (FIG. 16).

In the same way, the division between cloth 28 and 24 will only begin to move after the last passenger (P) of the cloth 28 has moved, and so on for all cloths of the initial static projection, that is, from cloth 32, to cloths 28, 24, 20, 16, 12. It should be noted that each cloth will disappear completely when its last passenger (P) leaves the surface of the virtual guide (120).

After cloth 12 has moved, cloth 8 will begin to show, and advance along the path of the dynamic mat (120), forming a size of at least 1.80 meters, and remaining so until there is no passenger (P) positioned on it. After the passengers (P) enter the current cloth area, the movement will become organic, keeping a minimum size of 1.80.

Figure 17:
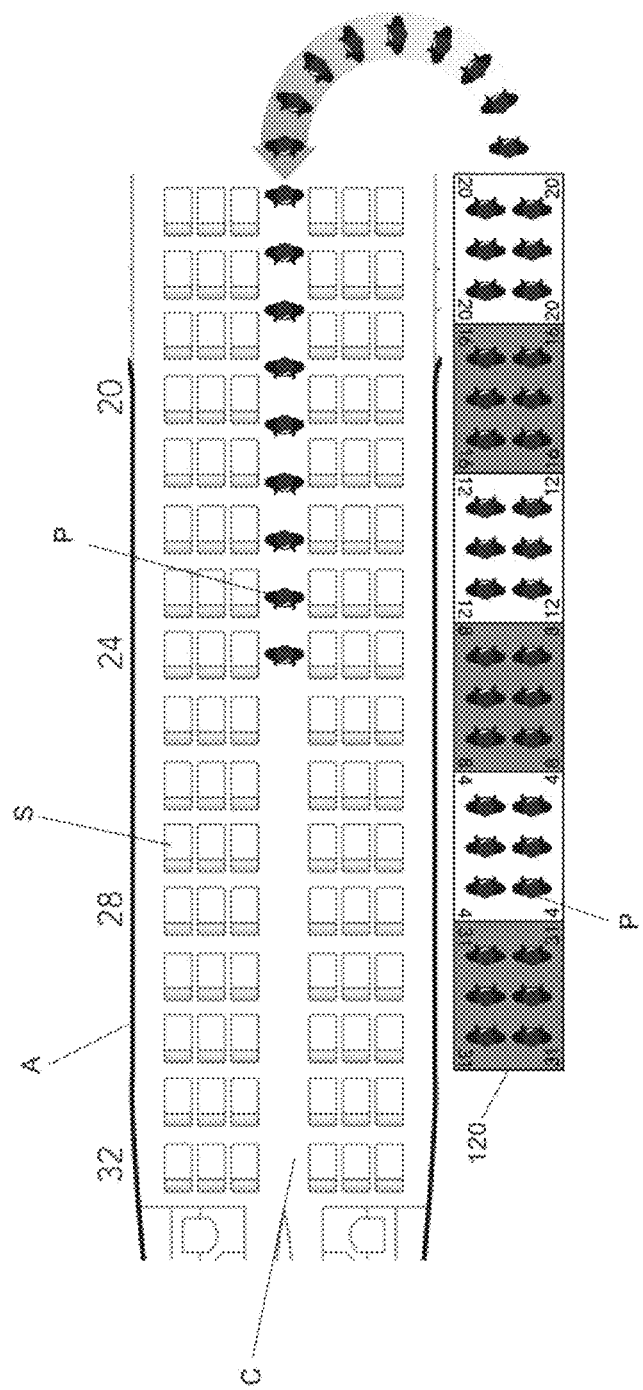
FIG. 17: shows the virtual guide in FIG. 16, schematically representing completion of boarding of the first wave and start of the second wave with the cloth 31 (from row 31)
Figure 18:
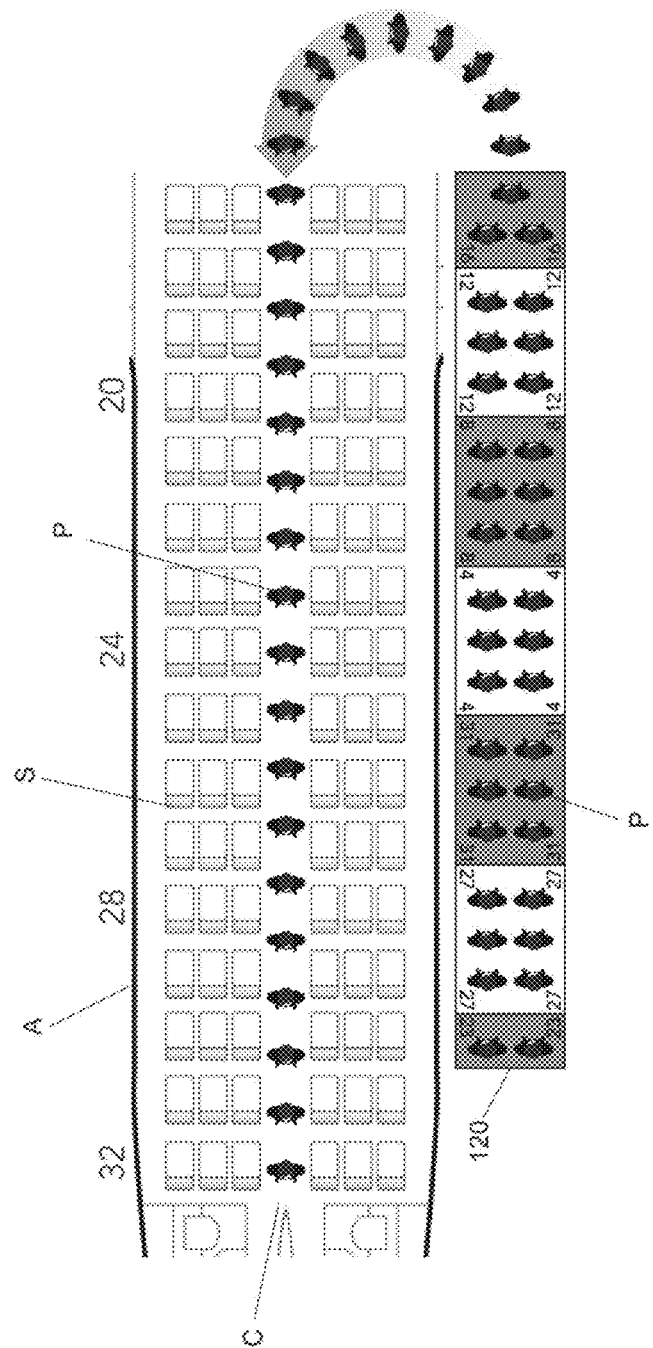
FIG. 18: shows the virtual guide in FIG. 17, schematically representing the advance of the second wave passengers and the virtual guide.
Figure 19:
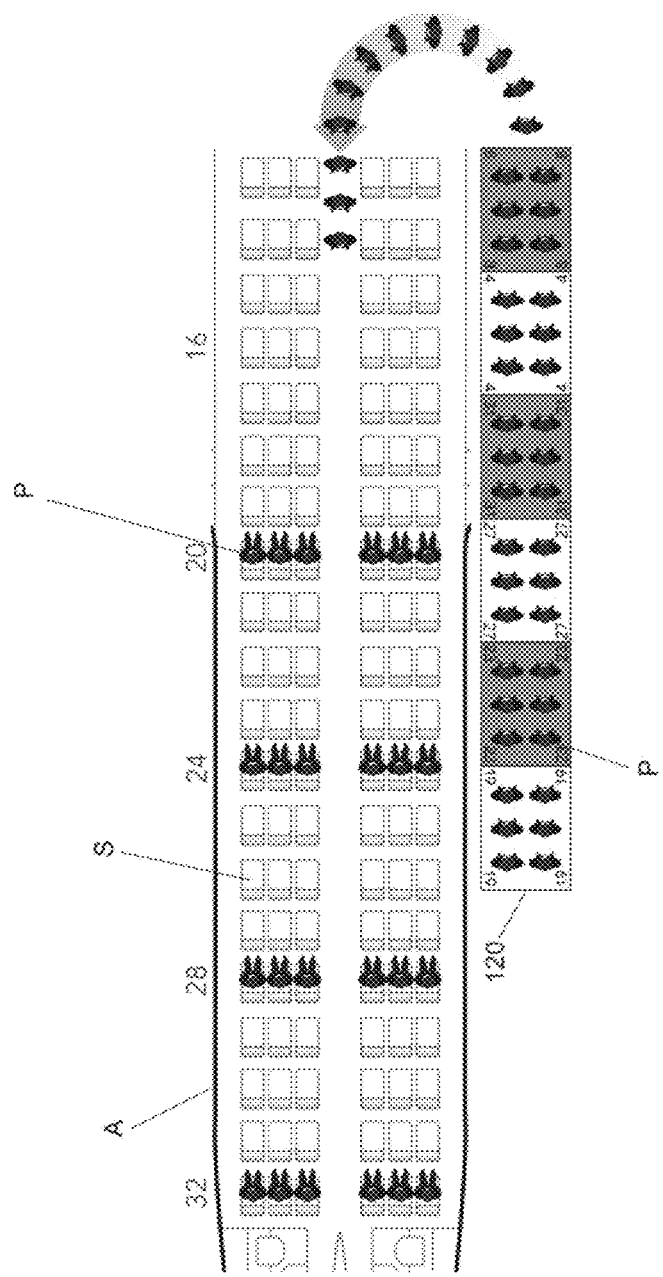
FIG. 19: shows the virtual guide in FIG. 18, schematically representing the passengers already seated (rows 32, 28, 24, 20) and the progress of the other passengers and of the virtual guide.

Passengers (P) on cloth 8 will have the entire route of the dynamic mat (120) to position themselves on it for continuing with boarding. Thus, successively, cloth 8 will appear, then cloth 4, obeying the concept of waves until all groups of the 4 waves have been formed (FIGS. 17, 18 and 19).

Said movement of all cloths (121, 122, 123, 124, 125, 126) and their divisions follows an organic concept, and the virtual guide (120), through sensors on the ground or above or laterally to the passengers (P), identifies their movement, creating orientation, formation and displacement of the virtual guide (120). Therefore, this organic boarding format depends only on previous selection of the aircraft (A) model and the type of boarding, so that it may proceed with the entire sorting of passengers (P) without the need for any other command.

Figure 20:
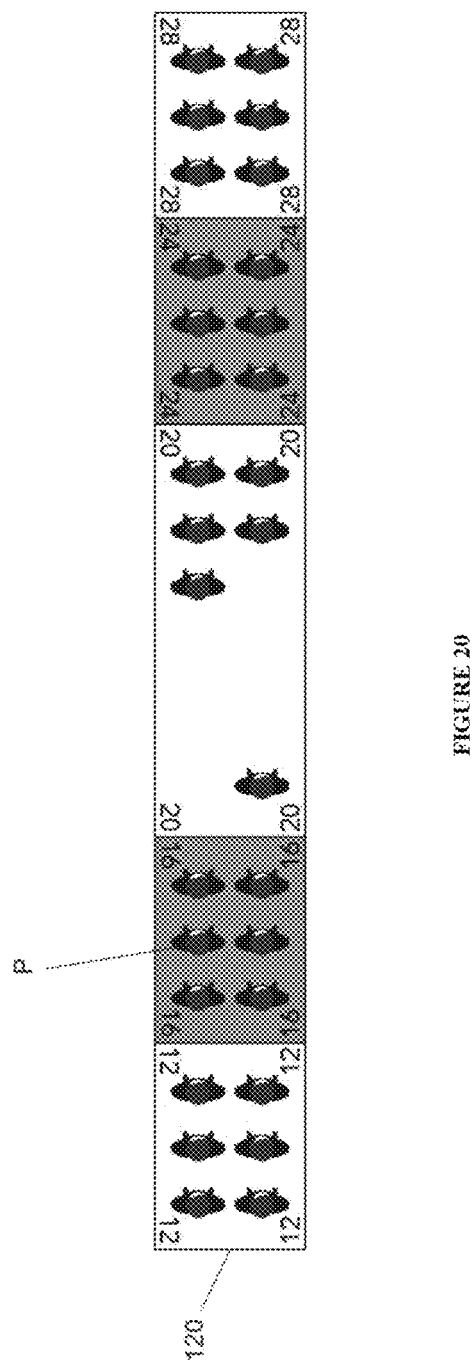
FIG. 20: shows the virtual guide according to the invention, demonstrating that the virtual guide works by creating a living organism effect, since passengers will only be guided by the guide when accessing it, in which the movement of the cloths in the guide will adapt to the movement of the passengers, in size, speed, acceleration and pause, proving that it is the passengers that move the guide and not the guide that moves the passengers.

In functioning this way, the virtual guide (120) creates the effect of a living organism, since passengers (P) will only be guided by the guide when accessing it (FIG. 20). After that, there is no longer any need for the passenger (P) to be guided by it, simply being required to follow the passenger (s) (P) in front of them as in a common line, as all movement of the cloths (121, 122, 123, 124, 125, 126) in the guide (120) will adapt to the movement of the passengers (P), in size, speed, acceleration and pause. In this way, it is clear that it is the passengers (P) who move the guide (120) and not the guide (120) who moves the passengers (P).

One can also imagine conducting the virtual guide (120) in a partially organic scheme and in a manual scheme.

In the case of a partially organic scheme, one can imagine a mat (120) having a division only between the 2 cloths in front of the mat, organically controlled, as described above. The formation and creation of the back cloths is a consequence of the movement of the first cloth, however the back cloths would have additional configurations, such as minimum length when passengers (P) on the mat are stopped, and maximum length for when they are in motion.

In the manual control version, control of the mat (120) can be carried out by a human operator, who would manually control the advance of the first cloths to create an effect similar to that of the movement in the partially organic scheme, carried out through a simple command given by the operator, moving forward or stopping or even pulling back the cloths.

It should be noted that the virtual guide (120), although smart, is simple and intuitive, easily understood by the passenger (P), eliminating any and all additional tools for leading passengers (P), complementary codes or signals, legends, instructions and, noticeably, does not require the passenger (P) to be connected to any devices or assisted by the ground crew.

The virtual guide (120) informs passengers (P), in the departure lounge, the passenger (P) attendance sequence for boarding, projecting sequential spaces, in the passenger (P) movement direction, sufficient to allow for physical settling, even in the departure lounge, of all passengers (P) in each group.

It should also be noted that the method according to the invention can be performed independently of the system of the invention, as a whole, as well as without the use of a virtual guide (120), and can be coordinated, for example, by visual and/or audible command and/or voice of the ground crew, making use of the infrastructure already installed, for example, monitors, displays, indicative arrows, paintings etc. already present at the airport.

Equipment

An equipment according to the invention is an equipment for passenger information, organization, leading, boarding and settling in collective transportation means, which aims to optimize resources by boarding passengers in sequential waves formed by groups of passengers, therefore, assisting in carrying out a method according to the invention, and being part of a system according to the invention.

The equipment of the invention is part of a composite set, being basically composed of a main unit comprising one or more data processing centers, one or more databases, one or more information presentation equipment and other devices and/or equipment that enable its operation for perfect integral and/or partial carrying out of the method according to the invention.

The equipment of the invention is, in particular, a virtual guide (120) equipment which is part of a system according to the invention for carrying out a method according to the invention.

Computer Programs

A computer program in accordance with the present invention is a computer program set in a computer-readable medium, associated to a system and/or one or more equipment in accordance with the invention, intended for carrying out a method in accordance with the invention and to coordination of one or more elements of the system according to the invention.

Another program in accordance with the present invention is a computer program set in a computer-readable medium, able to carry out a method according to the invention in a virtual guide (120) equipment according to the invention.

EXAMPLES

Extensive experiments and simulations were carried out and their results clearly illustrate the efficiency and effectiveness of the method according to the invention.

The simulations below were performed by a model applied to a simulator developed for a computer, intended to test the present method for boarding passengers in an aircraft, and in this model a single-aisle aircraft was considered, with a total of 192 seats, all occupied, divided into 32 rows of 6 seats each.

Regarding passenger behavior, the following variables were considered, randomly assigned to 192 occupants:
A) Passenger movement speed: from 0.8 to 1.2 meters per second;
B) line delay: 0.6 to 1 second (time of perception and start of passenger movement after movement of passenger in front);
C) Time for passenger settling and luggage storage: 4 to 32 seconds;
D) Getting up from a seat so that another passenger may settle: 3 to 5 seconds; and
E) Recognition time at the boarding counter: 3 to 9 seconds.

For the model of the invention, a boarding model of 6 passengers was used for every 24 seats, therefore with 4 waves having 8 groups per wave.

For comparison with the inventive wave model, two other simulated boarding methods were considered, one with a single row and the other with a double row, with division of the front and rear parts of the aircraft.

A double counter was also considered in the simulation for the method of the invention, with two people checking the boarding tickets, thus in this model the bottleneck would've been the counter, if a simple counter were used.

As the variables applied to passengers in the simulator are random, the times obtained varied between simulations performed.

Therefore, 50 (fifty) simulations were performed for each of the 3 boarding methods tested and the average of the results obtained was considered.

The time obtained in the simulations corresponds to the average time between entry into the aircraft by the first passenger and settling of the last passenger.

The average time obtained for the single line model was 22 minutes and 6 seconds, while the average time obtained in the double line model was 23 minutes and 3 seconds.

In turn, the average time obtained with the model of the invention was 10 minutes and 55 seconds.

Therefore, it is concluded that the time saved inside the aircraft is at least 50% in relation to the boarding models most commonly used in single-aisle aircrafts.

Even though 32-row aircraft (192 seats) are not so common, it was the model chosen because it represents the average occupancy of the most used single-aisle aircrafts.

CONCLUSION

The present invention provides a method, system, equipment and computer program that augment in a new and inventive way the solutions to problems of the state of the art for aircraft boarding logistics.

FINAL REMARKS

It will be easily understood by those skilled in the art that modifications can be made to the present invention without departing from the concepts set out in the description above. Such modifications should be considered as included within the scope of the present invention. Consequently, the particular embodiments described in detail above are only illustrative and exemplary and are not limiting to the scope of the present invention, which should be given the full extent of the appended claims and any and all equivalents thereof.

The invention claimed is:

1. A method for passenger information, organization, leading, boarding and settling in aircrafts, the method comprising:
   i. selecting an aircraft (A) model and boarding scheme based on data from a data processing center;
   ii. dividing a number of passengers (P), based on the data from the data processing center, in waves, each wave corresponding to the total number of passengers (P) who may stand at the same time in the aircraft's aisle (C), with enough room for everyone to stand and/or settle at the same time, with the confrontation between passengers (P) being possible only between subsequent waves;
   iii. dividing each wave, based on the previous step, in one or more passenger (P) groups and/or subgroups, the size of each group being limited to the number of seats (S) in its appointed row;
   iv. informing the passengers (P), using information display equipment connected to the data processing center, on a passenger (P) attendance sequence for boarding, projecting the number of their rows and/or their respective seat (S) numbers on the ground and start boarding by issuing an instruction to the passengers (P) to proceed to the boarding gate;
   v. issuing an instruction to the passengers (P) to present themselves to boarding control;
   vi. leading, boarding and settling, based on the previous steps, a first group of a first wave;
   vii. repeating steps iv and v;
   viii. leading, boarding and settling, based on the previous steps, a second group of the first wave that will occupy, in counterflow boarding direction, a next row of seats (S) at a distance from the row of the previous group such that it allows simultaneous performance, in a line, of all passengers (P) of the previous group in the aircraft (A) aisle (C);
   ix. repeating step vii;
   x. leading, boarding and settling, based on the previous steps, one or more next groups until all passengers (P) of a first wave are boarded;
   xi. repeating step ix; and
   xii. leading, boarding and settling, based on the previous steps, one or more next waves according to steps i to ix until all passengers (P) set for boarding are boarded, wherein a second wave will follow the same standard as the first wave, the first group intended to occupy the next row furthest from the aircraft entrance, in the counterflow direction, skipping one of the rows and, the next row of an even number if the first wave started with an even-numbered row or of an odd number if the first wave started with an odd-numbered row;

wherein the settling process is any intermediate situation of the passenger (P), between entry into the aircraft (A) and the final seat occupation (S), and the method is carried out using a passenger information, organization, leading, boarding and settling system on aircrafts, the system including:
a. a main unit including one or more data processing centers, one or more databases, one or more information presentation equipment, and other devices and/or equipment that enable its operation for integrity or partially carrying out the method defined above;
b. the information presentation equipment is a virtual guide that indicates the boarding sequence according to the method as defined below, being disposed directly on the ground and/or projected on the ground by means of projectors located above the passengers; and
c. the virtual guide is a dynamic mat formed by adjacent cloths being disposed directly on the ground and/or projected on the ground by means of projectors located above the passengers (P), wherein the dynamic mat follows the movement of passengers moving on the virtual guide towards a departure gate.

2. A system for passenger information, organization, leading, boarding and settling in aircrafts, comprising a main unit including one or more data processing centers, one or more databases, one or more information presentation equipment, and other devices and/or equipment that enable its operation for integrity or partially carrying out the method as defined below;
wherein the information presentation equipment is a virtual guide that indicates the boarding sequence according to the method as defined below, being disposed directly on the ground and/or projected on the ground by means of projectors located above the passengers;
wherein the virtual guide is a dynamic mat formed by adjacent cloths being disposed directly on the ground and/or projected on the ground by means of projectors located above the passengers (P), wherein the dynamic mat follows the movement of passengers moving on the virtual guide towards a departure gate; and
wherein the method is a method for passenger information, organization, leading, boarding and settling in aircrafts, the method comprising:
i. selecting an aircraft (A) model and boarding scheme based on data from a data processing center;
ii. dividing a number of passenger (P), based on the data from the data processing center, in waves, each wave corresponding to the total number of passengers (P) who may stand at the same time in the aircraft's aisle (C), with enough room for everyone to stand and/or settle at the same time, with the confrontation between the passengers (P) being possible only between subsequent wave having a size corresponding to the number of passengers (P) in a settling process, who may be standing at the same time in an aircraft (A) aisle (C);
iii. dividing each wave, based on the previous step, in one or more passenger (P) groups and/or subgroups, the size of each group being limited to the number of seats (S) in its appointed row;
iv. informing the passengers (P), using information display equipment connected to the data processing center, on a passenger (P) attendance sequence for boarding, projecting the number of their rows and/or their respective seat (S) numbers on the ground and start boarding by issuing an instruction to the passengers (P) to proceed to the boarding gate;
v. issuing an instruction to the passengers (P) to present themselves to boarding control;
vi. leading, boarding and settling, based on the previous steps, a first group of a first wave;
vii. repeating steps iv and v;
viii. leading, boarding and settling, based on the previous steps, a second group of the first wave that will occupy, in counterflow boarding direction, a next row of seats (S) at a distance from the row of the previous group such that it allows simultaneous permeance, in a line, of all passengers (P) of the previous group in the aircraft (A) aisle (C);
ix. repeating step vii;
x. leading, boarding and settling, based on the previous steps, one or more groups until all passengers (P) of a first wave are boarded;
xi. repeating step ix; and
xii. leading, boarding and settling, based on the previous steps, one or more next waves according to steps i to ix until all passengers (P) set for boarding are boarded, wherein a second wave will follow the same standard as the first wave, the first group intended to occupy the next row furthest from the aircraft entrance, in the counterflow direction, skipping one of the rows and, the next row of an even number if the first wave started with an even-numbered row or of an odd number if the first wave started with an odd-numbered row, wherein the settling process is any intermediate situation of the passenger (P), between entry into the aircraft (A) and final seat occupation.

3. The system according to claim 2, comprising equipment for passenger information, organization, leading, boarding and settling, which is a visual signaling set formed by devices that project and/or emit and/or present images and lights and that emit visual and sound signals, and that are connected directly to the data processing center, in the form of a virtual guide.

4. The system according to claim 3, wherein the lines of passengers (P) formed are automatically dissipated following the forward pace of the last passenger (P) formed are automatically dissipated following the forward pace of the last passenger (P) of the last group of a wave, that is, as the last passenger (P) of each wave settles.

5. A non-transitory computer-readable medium storing instructions for passenger information, organization, leading, boarding and settling in aircrafts that are executable by a processing device, wherein execution of the instructions by the processing device causes the processing device to:
i. selecting an aircraft (A) model and boarding scheme based on data from a data processing center;
ii. dividing a number of passengers (P), based on the data from the data processing center, in waves, each wave corresponding to the total number of passengers (P) who may stand at the same time in the aircraft's aisle (C), with enough room for everyone to stand and/or settle at the same time, with the confrontation between passengers (P) being possible only between subsequent waves;
iii. dividing each wave, based on the previous step, in one or more passenger (P) groups and/or subgroups, the size of each group being limited to the number of seats (S) in its appointed row;
iv. informing the passengers (P), using information display equipment connected to the data processing center, on a passenger (P) attendance sequence for boarding, projecting the number of their rows and/or their respective seat (S) numbers on the ground and start boarding by issuing an instruction to the passengers (P) to proceed to the boarding gate;
v. issuing an instruction to the passengers (P) to present themselves to boarding control;
vi. leading, boarding and settling, based on the previous steps, a first group of a first wave;
vii. repeating steps iv and v;
viii. leading, boarding and settling, based on the previous steps, a second group of the first wave that will occupy, in counterflow boarding direction, a next row of seats (S) at a distance from the row of the previous group such that it allows simultaneous performance, in a line, of all passengers (P) of the previous group in the aircraft (A) aisle (C);
ix. repeating step vii;
x. leading, boarding and settling, based on the previous steps, one or more next groups until all passengers (P) of a first wave are boarded;
xi. repeating step ix; and
xii. leading, boarding and settling, based on the previous steps, one or more next waves according to steps i to ix until all passengers (P) set for boarding are boarded, wherein a second wave will follow the same standard as the first wave, the first group intended to occupy the next row furthest from the aircraft entrance, in the counterflow direction, skipping one of the rows and, the next row of an even number if the first wave started with an even-numbered row or of an odd number if the first wave started with an odd-numbered row;
wherein the settling process is any intermediate situation of the passenger (P), between entry into the aircraft (A) and the final seat occupation (S), and the method is carried out using a passenger information, organization, leading, boarding and settling system on aircrafts, the system including:
a. a main unit including one or more data processing centers, one or more databases, one or more information presentation equipment, and other devices and/or equipment that enable its operation for integrity or partially carrying out the method defined above;
b. a main unit including one or more data processing centers, one or more databases, one or more information presentation equipment, and other devices and/or equipment that enable its operation for integrity or partially carrying out the method defined above;
c. the information presentation equipment is a virtual guide that indicates the boarding sequence according to the method as defined below, being disposed directly on the ground and/or projected on the ground by means of projectors located above the passengers; and
d. the virtual guide is a dynamic mat formed by adjacent cloths being disposed directly on the ground and/or projected on the ground by means of projectors located above the passengers (P), wherein the dynamic mat follows the movement of passengers moving on the virtual guide towards a departure gate.

* * * * *